United States Patent
Doi

(10) Patent No.: US 8,788,934 B2
(45) Date of Patent: Jul. 22, 2014

(54) EXI ENCODER AND COMPUTER READABLE MEDIUM

(75) Inventor: Yusuke Doi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/238,393

(22) Filed: Sep. 21, 2011

(65) Prior Publication Data

US 2012/0254725 A1    Oct. 4, 2012

(30) Foreign Application Priority Data

Mar. 28, 2011    (JP) .................................. 2011-70694

(51) Int. Cl.
*G06F 17/21*    (2006.01)

(52) U.S. Cl.
USPC ............................ 715/234; 715/239; 715/242

(58) Field of Classification Search
USPC .......................................... 715/234, 239, 242
See application file for complete search history.

(56) References Cited

U.S. PATENT DOCUMENTS

2010/0174753 A1*  7/2010  Goranson .................... 707/791
2010/0211867 A1   8/2010  Heuer et al.

FOREIGN PATENT DOCUMENTS

| CN | 101807205 A | 8/2010 |
|---|---|---|
| JP | 10-240652 A | 9/1998 |

OTHER PUBLICATIONS

Schneider et al.; Efficient XML Interchange (EXI) Format 1.0, W3C Working Draft; Dec. 19, 2007; W3C; pp. 1-84.*
Bray et al.; Extensible Markup Language (XML) 1.0; Nov. 26, 2008; W3C; Fifth Edition; pp. 1-52.*
"Parity" and "Parity Bit;" Microsoft Computer Dictionary; Mar. 15, 2002; Microsoft Press; Fifth Edition; pp. 493-494.*
Peintner et al.; Efficient XML Interchange (EXI) Primer; Dec. 19, 2007; W3C; pp. 1-22.*
Rader et al.; Efficient Extensible Markup Language (XML) Interchange (EXI); Jan. 2010; IJIS Institute; pp. 1-36.*
Chinese Office Action dated Jan. 15, 2014 (and English translation thereof) in counterpart Japanese Application No. 201110339362.X.
Chinese Office Action dated Jan. 15, 2014 (and English translation thereof) in counterpart Chinese Application No. 201110339362.X.

* cited by examiner

*Primary Examiner* — Andrew Dyer
(74) *Attorney, Agent, or Firm* — Holtz Holtz Goodman & Chick PC

(57) ABSTRACT

An EXI encoder is based on XML schema defining an XML document that includes a head portion, a body portion which can be repeated X times or more and which contains a variable content, and a tail portion. A reading unit sequentially reads input data corresponding to the variable content as many as the number of times the body portion is repeated. A head portion encoder generates an EXI bit string corresponding to the head portion. A body portion encoder generates an EXI bit string corresponding to the body portion in which the variable is replaced with the input data each time input data is read by the reading unit. A tail portion encoder generates an EXI bit string corresponding to the tail portion. An output unit outputs an EXI stream including the EXI bit strings.

4 Claims, 5 Drawing Sheets

EXI ENCODER AND COMPUTER READABLE MEDIUM

CROSS REFERENCE TO RELATED APPLICATIONS

This application is based upon and claims the benefit of priority from the prior Japanese Patent Application No. 2011-70694, filed on Mar. 28, 2011, the entire contents of which are incorporated herein by reference.

FIELD

An embodiment of the present invention relates to an EXI (Efficient XML (Extensible Markup Language) Interchange) encoder and a computer readable medium.

BACKGROUND

Decoders that generate a decoder program through interpretation by a finite state machine based on ASN.1 are conventionally known.

It is conceivable to produce an EXI encoder through a similar process. An EXI encoder generally refers to an encoder for converting a text XML document into a binary format in accordance with EXI specifications for efficient exchange of XML documents.

To correctly map bit strings to be generated using such an EXI encoder to elements of an XML document, it is necessary to prepare all items in the original XML document for encoding in advance, which results in an increased amount of code and/or computation resources such as required memory capacity. Such an EXI encoder is not suited for inclusion into an embedded device with limited resources.

DETAILED DESCRIPTION

According to one aspect of embodiments, there is provided an EXI (Efficient XML Interchange) encoder based on XML (Extensible Markup Language) schema defining a construction of an XML document, the XML document including a head portion, a body portion and a tail portion, the head portion containing fixed XML content the body portion being capable of being repeated X times or more (X being an integer equal to or greater than 0) and containing a variable content and having fixed XML content, and the tail portion containing fixed XML content.

The encoder includes: a reading unit, a head portion encoder, a body portion encoder, a tail portion encoder and an output unit.

The reading unit sequentially reads input data assigned to a variable symbol as a replacement target as many as a number of times the body portion is repeated.

The head portion encoder generates a first EXI bit string corresponding to the fixed XML content of the head portion.

The body portion encoder generates a second EXI bit string corresponding to the fixed XML content in the body portion in which the variable content are replaced with the input data each time the input data is read by the reading unit.

The tail portion encoder generates a third EXI bit string corresponding to the fixed XML content of the tail portion.

The output unit outputs an EXI stream including the first EXI bit string, the second EXI bit string, and the third EXI bit string.

Figure 1:
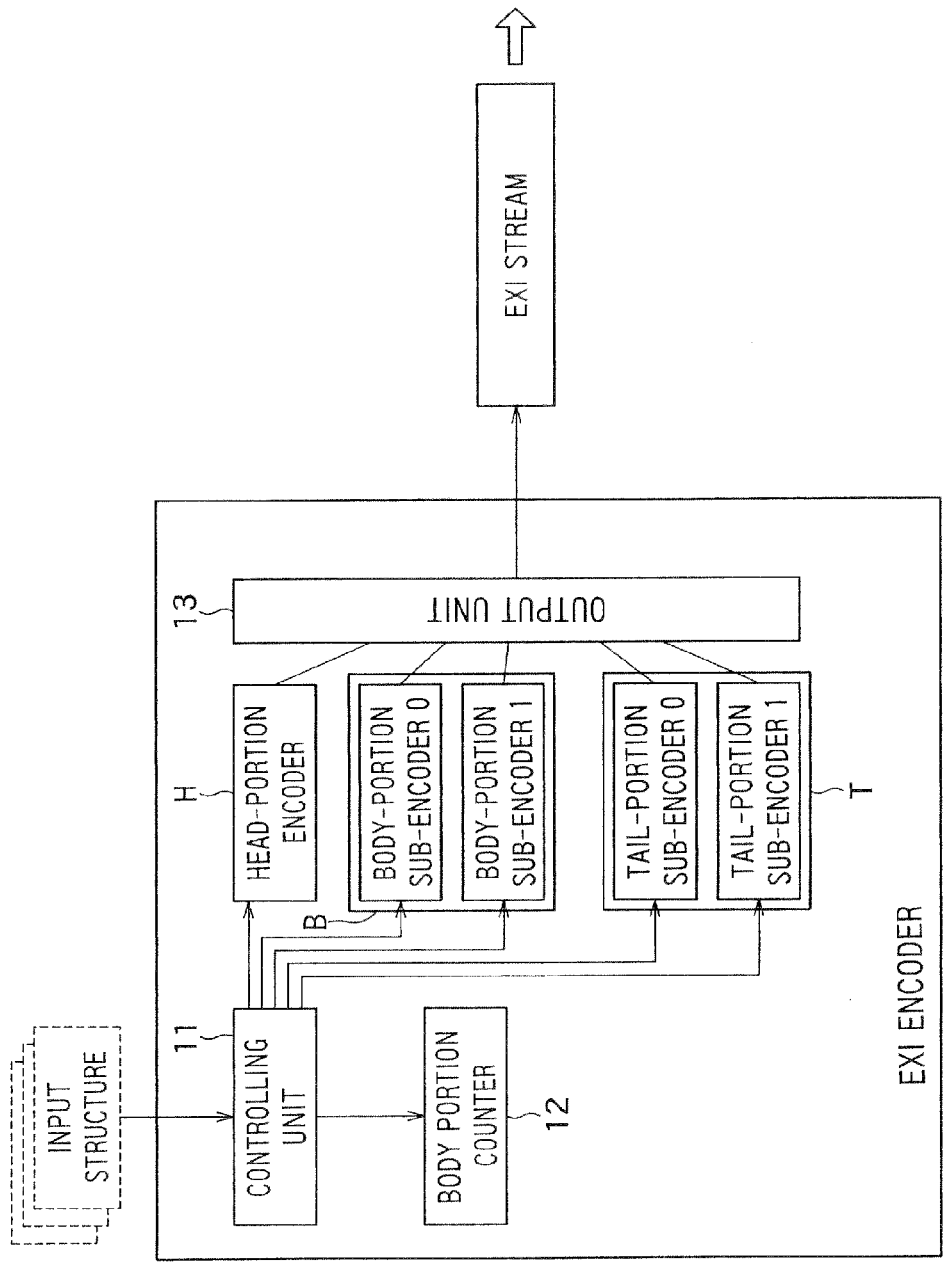
FIG. 1 shows a configuration of an EXI encoder according to an embodiment of the invention.

FIG. 1 shows a configuration of an EXI encoder according to an embodiment of the invention.

This EXI encoder is based on an XML document (a template for an imaginary XML document that corresponds to EXI stream content) including a head portion containing fixed XML content, a body portion which can be repeated X times or more (X is an integer equal to zero or greater) and which contains variable contents and has fixed description except the variable contents, and a tail portion containing fixed XML content, and on an XML schema defining the construction of the document.

In the present embodiment, when a plurality of variable contents are present in one BODY portion, they are collectively called a structure, where each variable content may be called a structure member. In the present embodiment, use of the structure is assumed.

A variable content is described within main body surrounded by tags or at a point of attribute value within a tag, for example.

A controlling unit (a reading unit) 11 sequentially reads input data for structures (input structures) as many as the number of times a BODY portion is repeated.

A HEAD portion encoder H generates an EXI bit string (first EXI bit string) corresponding to the fixed XML content of the HEAD portion.

A BODY portion counter 12 counts the number of times input data has been processed (i.e., how many input structures have been processed).

A BODY portion encoder B generates an EXI bit string (second EXI bit string) corresponding to XML content with BODY portion variables replaced with input data on each reading of input data. A BODY portion sub-encoder 0 reads the first input data and a BODY portion sub-encoder 1 reads the second and subsequent input data. Thereby, an EXI bit string according to how many times data has been read before the input data is generated. This will be described in detail below.

A TAIL portion encoder T generates an EXI bit string (third EXI bit string) corresponding to the fixed XML content of the TAIL portion. More specifically, in the present embodiment, the TAIL portion sub-encoder 0 generates an EXI bit string when there is zero BODY portion and the TAIL portion sub-encoder 1 when there is one or more BODY portions. Thereby, an EXI bit string reflecting how many times a BODY portion is repeated is generated. This will be described in more detail later.

An output unit 13 outputs an EXI stream which is a sequence of the EXI bit string from the HEAD portion encoder, zero or more EXI bit string(s) from the BODY portion encoder, and the EXI bit string from the TAIL portion encoder. The output EXI stream is sent to a receiving device and decoded thereon to reproduce an XML document.

The present embodiment is described below in greater detail. At the end of the specification, Examples A.1 to A.6 are provided as sample data, which will be referenced where appropriate. In the Examples, a portion surrounded by '@' symbols specifically represents a varying portion, in which a member name (a variable content) is described.

The EXI encoder shown in FIG. 1 includes a HEAD portion encoder H, a BODY portion counter 12, a BODY portion encoder B consists of two BODY portion sub-encoders 0 and 1, a TAIL portion encoder T consists of two TAIL portion sub-encoders 0 and 1, a controlling unit 11 to drive and control the encoder in accordance with input from a caller, and an output unit 13. Values for a structure as input (input data) are given by the caller and read in by the controlling unit 11.

Depending on the format of an input structure and/or a target XML schema, the two BODY portion sub-encoders 0 and 1 or the two TAIL portion sub-encoders 0 and 1 could be the same.

The controlling unit 11 initializes the BODY portion counter 12 to zero at the time of initialization and then calls the HEAD portion encoder H. The HEAD portion encoder H outputs an EXI bit string for the HEAD portion which is provided with in advance. That is, the HEAD portion encoder H generates, with initialization parameters as input and in the EXI format, initial information for a stream corresponding to the beginning of an EXI stream to be output.

Each time one input data (a structure) is given, the controlling unit 11 passes the data to the BODY portion encoder B. The BODY portion sub-encoder 0 is used when the BODY portion counter 12 is zero and the BODY portion sub-encoder 1 when the body portion counter 12 is non-zero. The BODY portion sub-encoder 0 or the BODY portion sub-encoder 1 generates and outputs an EXI bit string based on the given data. More specifically, the BODY portion sub-encoder 0 or the BODY portion sub-encoder 1 receives a structure as input, and generates an EXI bit string equivalent to XML content in which the values for members of the structure are described at points where member names of the BODY portion are described.

The controlling unit 11 also increments the value of the BODY portion counter 12 each time input data is processed by the BODY portion encoder B.

When all input data has been processed by the BODY portion encoder B, the controlling unit 11 calls the TAIL portion encoder T. The TAIL portion encoder T uses the TAIL portion sub-encoder 0 when the BODY portion counter 12 is zero (i.e., when no data or structure has been input) and uses the TAIL portion sub-encoder 1 when the BODY portion counter 12 is non-zero. The TAIL portion sub-encoder 0 or 1 outputs an EXI bit string for the TAIL portion which is provided with in advance. That is, the TAIL portion encoder T generates an element to close a stream (equivalent to XML content for the TAIL portion) in EXI format.

The output unit 13 assembles the EXI bit strings from the HEAD portion encoder H, encoder B (BODY portion sub-encoders 0 and 1), and TAIL portion encoder T (TAIL portion sub-encoder 0 or 1) into an EXI stream and outputs the stream.

Figure 2:
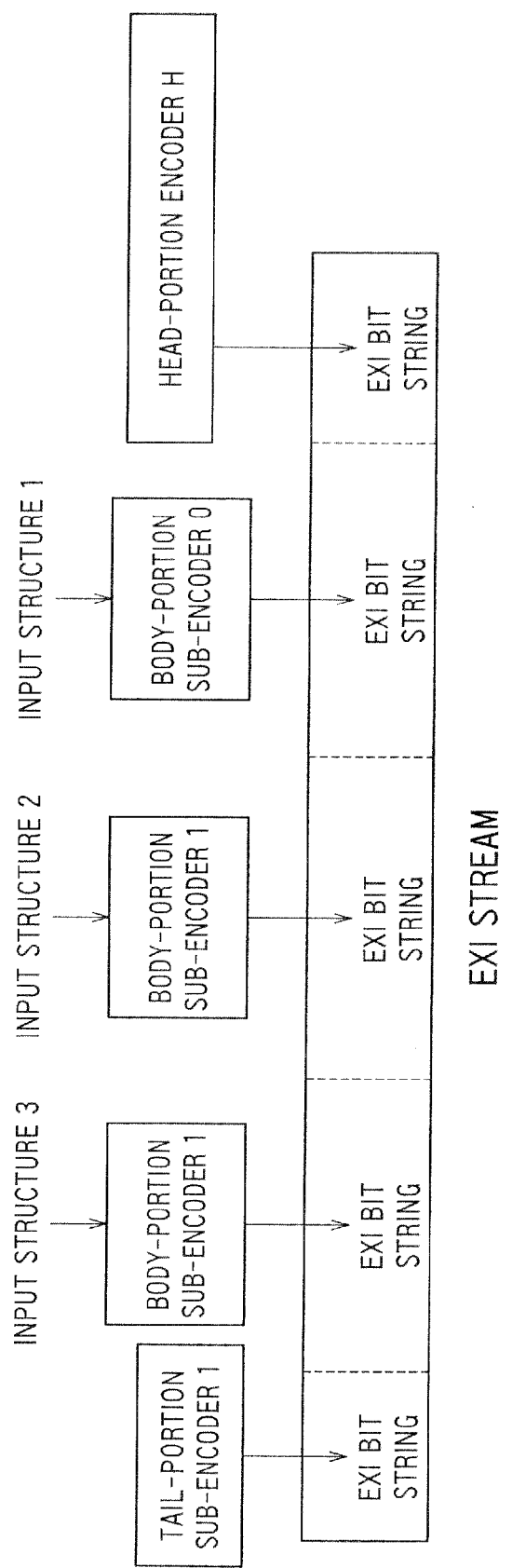
FIG. 2 is a diagram for illustrating an example of EXI stream structure.
Figure 3:
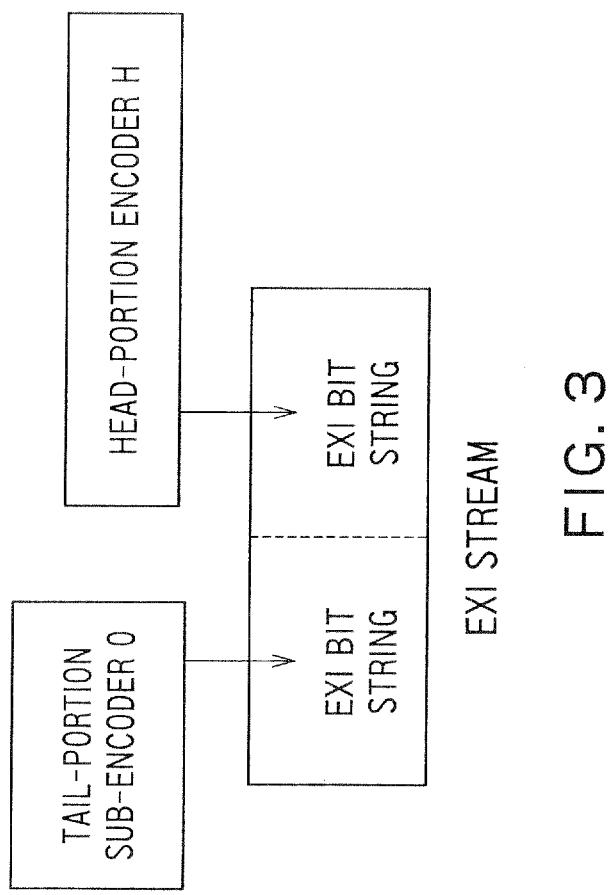
FIG. 3 is a diagram for illustrating another example of EXI stream structure.

FIG. 2 schematically shows an exemplary construction of an output EXI stream. The example of FIG. 2 represents a case where three structures (structures 1 to 3) are given. FIG. 3 schematically shows an exemplary construction of an EXI stream with no structure given (i.e., the HEAD portion being followed by the TAIL portion).

While the present embodiment generates an EXI stream with only supply of an input structure without giving an XML document, conversion from an XML document to EXI format is described below for the purpose of understanding.

The conversion from an XML document to EXI format is based on EXI grammar generated from XML schema (Schema-informed Grammar [1] Section 8.5). The EXI grammar and an EXI stream generated with it have features shown below. As is well known, XML schema defines the construction of an XML document. The EXI grammar is generated from XML schema by a known method.

1. Representing an XML document from its beginning in the form of events, such as "Element" (e.g., SE and EE), "Attribute" (AT), and "Characters" (CH) (e.g., representing in SAX events).

2. The EXI grammar has grammars based on the number of state transitions permitted by XML schema and event codes are assigned to the state transitions in order.

3. Representing an event with an integer of a minimum bit width that can represent the number of state transitions (depending on options).

Due to the second and third features, normal communication is difficult unless a sending device (a device having an EXI encoder) and a device receiving the EXI stream have the same EXI grammar. It is also difficult to skip unknown tags, which is common in typical XML processing, on the receiving device.

In addition, state transition and therefore an output bit string can vary even for a seemingly same representation in such cases as shown below.

1. Optional XML Attribute

When there is an attribute X that may or may not be present, for a state immediately preceding the attribute, a transition leading to occurrence of attribute X and a transition leading to occurrence of a next attribute or a node are present. In other words, in a grammar in which attribute Y follows optional Attribute X, an event code for Attribute Y when Attribute X is present and an event code for Attribute Y when Attribute X is not present can be different.

2. Node with minOccur=0

As with the case of the optional XML attribute described above, when there is a node that may not be present, an event code for an element that follows the node can vary. A node with minOccur=0 means that it does not have to be present.

3. Node with maxOccur Being Two or Greater

Even for an XML element (Node P) having the same contents, an event code for transitioning to a Node P from the grammar corresponding to the previous element and an event code for transitioning to a Node P from a Node P can be different. A node for which maxOccur is two or greater means that the node can be repeated that number of times (which corresponds to BODY portion of the present embodiment, for example).

The XML document handled in the present embodiment has one HEAD portion, zero or more BODY portion(s), and one TAIL portion.

For each of the HEAD, BODY and TAIL portions, whether child elements and attributes are present or not can be determined depending on input data.

The EXI encoder according to the present embodiment keeps bit strings (or binary strings) including event codes in advance for all of state transitions between EXI grammars for which an event code can vary depending on the number of inputs and whether input is present or not. Thus, by selecting a bit string in accordance with whether data is present, a boolean value, and the number of data items as input, an EXI stream that can be correctly decoded can be easily created.

This will be described using a specific example.

Example A.1 shows an exemplary template for an imaginary XML document.

This document conforms to the schema shown in Example A.5 and the EXI grammar shown in Example A.6 is derived from the schema. The schema example is cited from Reference Literature 1 (John Schneider and Takuki Kamiya, Efficient XML Interchange (EXI) Format 1.0. W3C Candidate Recommendation, December 2009, http//www.w3.org/TR/exi/). The EXI grammar shown in Example A.6 is also cited from Reference Literature 1.

The EXI grammar shows grammar for "order" ("Complete grammar for element <order>") and grammar for "product" ("Complete grammar for element <product>"). In each grammar, further detailed grammars are defined. "Term-product 0,0" and "Term_product 0,1" in the grammar for <order> and "Use_color0" in the grammar for <product> are grammar names. The EXI grammar consists of four parts: LeftHandSide, Terminal, NonTerminal, and EventCode. When a "Terminal" event occurs in LeftHandSide state, EventCode is output and a transition to NonTeminal state takes place.

Assuming that a range indicated by "/order/product" tags (Xpath notation) represents a BODY portion (a repeated portion), HEAD, BODY, and TAIL portions are arranged as shown in Example A.2. Specifically, when the three structures shown in Table A.3 are input (one row corresponds to one structure and each element of a structure represents a member (a variable)), an imaginary XML document expected to be output, that is, an XML document corresponding to an EXI stream, is as shown in Example A.4.

Hereinafter in the present embodiment, bits of an arbitrary length starts with "0b" and is represented in a string of 0's and 1's. When an arbitrary character string is denoted with quotation marks ("), this means it is a byte sequence represented in UTF-8, a format handled in XML.

An encoding process according to the present embodiment starts with the HEAD portion encoder H.

At initialization, the BODY portion counter 12 is initialized to zero. The HEAD portion encoder H includes an EXI bit string corresponding to Example A.2.1 in addition to an EXI header (typically two bytes). The HEAD portion encoder H outputs the EXI bit string which is included in response to a call from the controlling unit 11.

The BODY portion encoder B is given as input one of the rows shown in Example A.3 as a unit and outputs an EXI bit string. The BODY portion sub-encoder 0 is given data for the first row (a structure). The BODY portion sub-encoder 0 outputs 0b0 and further outputs the result of encoding the contents of the BODY portion (i.e., an EXI bit string representing XML content of the BODY in which member names of a structure are replaced with the first-row data).

The BODY portion sub-encoder 1 is given data for the second row and on. When the second or subsequent data is given, it outputs 0b00 for each piece of data and then outputs the result of encoding contents of the BODY portion.

The reason for first outputting 0b0 for the first row data and 0b00 for data on the second and subsequent rows is that grammar Term_product 0,0 applies when the BODY portion counter 12 is zero and grammar Term_product 1,0 applies when the BODY portion counter 12 is non-zero.

The BODY portion sub-encoder 0 is described in further detail below.

A BODY portion begins with start of "product" tag. In other words, it begins with SE ("product") and because a first level of grammar has two states, 0 and 1, (i.e., can be represented in one bit), the BODY portion sub-encoder 0 outputs 0b0. Thereafter, it outputs a bit string corresponding to provided data (structures). The controlling unit 11 increments the BODY portion counter 12.

The first level refers to the leftmost number in an event code in the EXI grammar. For example, for grammar Term_product 0,0, there are eight event codes as follows:

0
1.0
1.1
1.2
1.3
1.4.0
1.5
1.6.

The leftmost numbers are only either 0 or 1 (i.e., of two kinds), so the state of the first level can be represented in one bit.

Similarly for grammar Term_product 1,0, there are four event codes as follows:

0
1
2.0
2.1.

The leftmost numbers are 0, 1, or 2 (i.e., of three kinds), so the state of the first level can be represented in two bits.

When the controlling unit 11 is called for the second time with a structure as an argument, it calls the BODY portion sub-encoder 1 to which grammar Term_product 1,0 corresponds because the BODY portion counter 12 is non-zero. That is, Term_product 0,0 specifies that event code 0 is output for SE ("product") to cause a transition to Term_product 1,0.

At this point, it is known in advance that a two-bit event code needs to be output because there are three kinds of code, 0, 1, 2 and 3, for the first level of grammar as mentioned above. The BODY portion sub-encoder 1 outputs 0b00 (i.e., two-bit representation of event code "0") at a situation where the same SE ("product") is output. After that, it outputs a bit string in accordance with input data given just as the BODY portion sub-encoder 0. The controlling unit 11 increments the BODY portion counter 12.

When the controlling unit 11 is called for the third time with a structure as an argument, the same process as the second call takes place because Term_product 1,0 is repeated. That is, Term_product 1,0 specifies that event code 0 is output and then a transition again to the same Term_product 1,0 occurs for SE ("product").

Finally, the TAIL portion encoder T ends the "order" tag.

The TAIL portion sub-encoder 0 operates when there is zero BODY portion, outputting EE (1.0) for Term_product 0,0 i.e., 0b1000, which is concatenation of one-bit 1 length and three-bit length 0's. In other words, because "0" of "1,0" corresponds to the second level and there are seven kinds of code, 0, 1, 2, 3, 4, 5 and 6, in the second level, the second level requires three bits for representation.

When a BODY portion occurs even once, a transition to Term_product 1,0 occurs and there will never be a return to Term_product 0,0. The TAIL portion sub-encoder 1 operates when there is one or more BODY portions, outputting EE(1) for Term_product 1,0, i.e., 0b01, which is a two-bit length 1.

The following shows how to encode the contents of a BODY portion, that is, how to generate an EXI bit string representing an XML document in which member names (or variable contents) of a structure in the BODY portion are replaced with input data.

The grammar employed in the present embodiment expects that a stream is constructed in the order of "color" attribute, "sku" attribute, "quantity" element, and "price" element (see Examples A.1 and A.2).

Although not utilized in the present embodiment, "description" element may be present.

In the present embodiment, composition of a BODY portion is fixed and does not vary except four parts, "SKU", "COLOR", "QUANTITY", and "PRICE". Accordingly, a bit string describing the structure of BODY portion is created by a general EXI encoding means in advance and only varying portions can be replaced with input data.

In the BODY portion, EXI-encoded bit strings corresponding to the following five portions are maintained.

1. From start of "product" tag to immediately before content description for "sku" attribute (equivalent to "<product sku=")
2. From immediately after the content description for "sku" attribute to immediately before content description for "color" attribute (equivalent to "color=")
3. From immediately after the content description for "color" attribute to immediately before content description for "quantity" element (equivalent to "><quantity>")
4. From immediately after the content description for "quantity" element to immediately before content description for "price" element (equivalent to "</quantity><price>"), and
5. From immediately after the content description for "price" element to the end of "order" tag (equivalent to "</price></order>").

Figure 4:
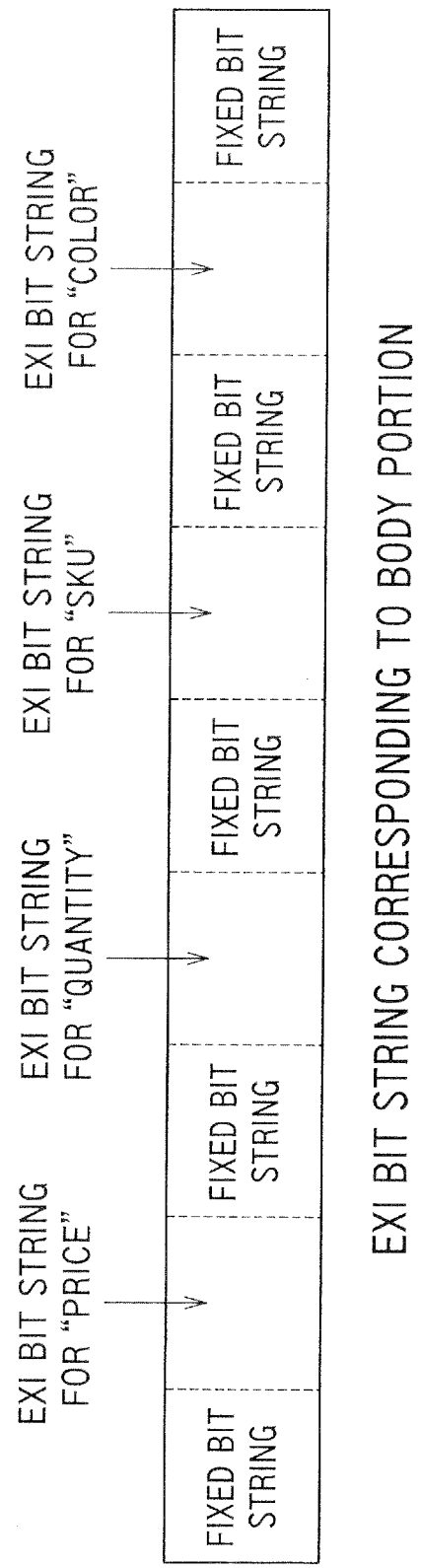
FIG. 4 schematically illustrates an exemplary composition of an EXI bit string for a BODY portion.

Inserting bit strings for variables (i.e., members) given as input between these bit strings results in a bit string equivalent to one in which the BODY portion reflecting the input data is described with the EXI grammar. An exemplary composition of an EXI bit string for a BODY portion is schematically shown in FIG. 4.

Figure 5:
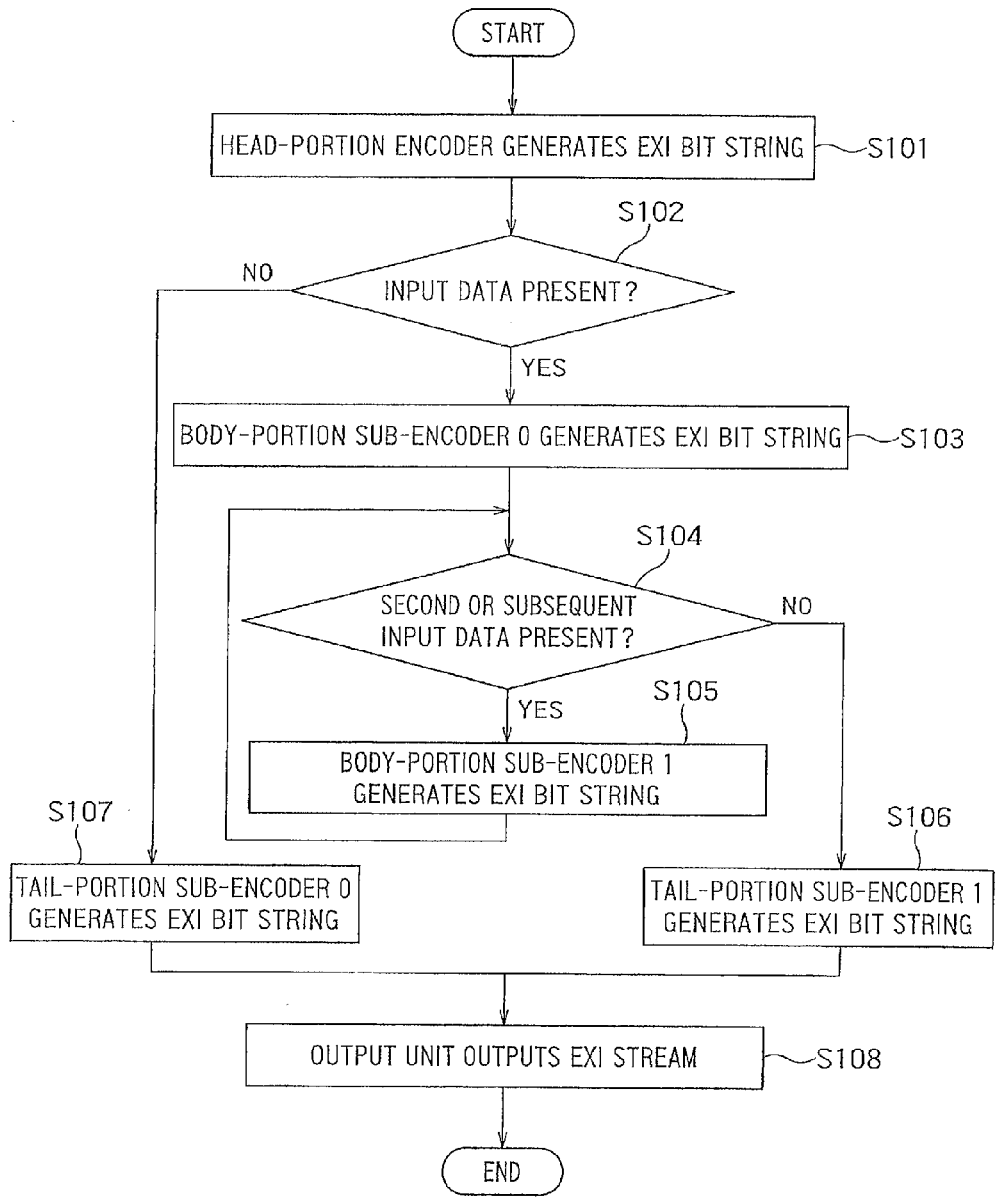
FIG. 5 is a flowchart showing a flow of processing performed by the EXI encoder.

FIG. 5 is a flowchart showing an operation flow for an EXI encoder.

After the encoder is activated, the controlling unit 11 sends an output instruction to the HEAD portion encoder H, and the HEAD portion encoder H sends an EXI bit string included in the encoder H (i.e., an EXI bit string generated by converting XML content of the HEAD portion) to the output unit 13 (S101).

The controlling unit 11 attempts to read data for a structure (multiple variables) from outside. If data is present (YES at S102), it passes the read data to the BODY portion sub-encoder 0. The BODY portion sub-encoder 0 generates an EXI bit string based on the received data and sends the EXI bit string to the output unit 13 (S103). The controlling unit 11 then increments the BODY portion counter 12.

The controlling unit 11 again attempts to read data. If the second or further data is present (YES at S104), the controlling unit 11 sends the data to the BODY portion sub-encoder 1. The BODY portion sub-encoder 1 generates an EXI bit string based on the data and sends it to the received output unit 13 (S105). When there is no more input data (NO at S104), the controlling unit 11 issues an output instruction to the TAIL portion sub-encoder 1. The TAIL portion sub-encoder 1 sends a bit string included in the TAIL portion sub-encoder 1 (an EXI bit string generated by converting XML content of the TAIL portion, corresponding to Term_product 1,0) to the output unit 13 (S106).

If there is no data in data reading at step S102 (No at S102), the controlling unit 11 sends an output instruction to the TAIL portion sub-encoder 0. The TAIL portion sub-encoder 0 outputs a bit string included in the TAIL portion sub-encoder 0 (an EXI bit string generated by converting XML content for the TAIL portion, corresponding to Term_product 0,0) (S107).

The output unit 13 arranges the EXI bit strings received from the HEAD portion encoder H, BODY portion sub-encoders 0 and 1, TAIL portion encoder 0 or 1 in the order they were received into an EXI stream, and outputs the EXI stream to a receiving device (S108).

The above-described method enables generation of an EXI stream reflecting input data (input structures) based on XML schema without using an XML document as input.

As described above, according to the present embodiment, dedicated and efficient encoding can be implemented for EXI grammars given by a particular XML schema. Especially for processing of a kind that uses only a portion of freedom of data description permitted in XML schema, encoding can be performed far more efficiently than with a typical encoder using XML as input. Although the embodiment is limited to the HEAD/BODY/TAIL format for the sake of simplicity, nested composition or inclusion of two or more types of BODY portion are also possible as natural extensions to the principles of combination of constant and variable portions and change to constants based on how many times a structure is repeated.

The EXI encoder according to the above described embodiment can also be realized by using a generic computer device as basic hardware, for example. That is, the controlling unit, BODY portion counter, HEAD portion encoder, BODY portion encoder and TAIL portion encoder of the EXI encoder can be realized by having a processor included in the computer device execute a program.

In that case, the EXI encoder may be realized by installing the program in the computer device in advance, or distributing the program stored on a storage medium, such as a CD-ROM, or via a network and appropriately installing the program into the computer device.

A. Sample Data
A.1 Example Template for an Imaginary XML Document

```
<?xml>
<order>
    <product sku="@SKU@" color="@COLOR@">
        <quantity>@QUANTITY@</quantity>
        <price>@PRICE@</price>
    </product>
</order>
```

A.2. Example Division of a Template for an Imaginary XML Document
A.2.1 HEAD Portion

```
<?xml>
<order>
```

A.2.2. BODY Portion

```
<product sku="@SKU@" color="@COLOR@">
<quantity>@QUANTITY@</quantity>
<price>@PRICE@</price>
</product>
```

A.2.3. TAIL Portion
</order>
A.3. Input to Encoder

| @SKU@ | @COLOR@ | @QUANTITY@ | @PRICE@ | |
|---|---|---|---|---|
| 1JB339 | white | 40 | 339.50 | input structure 1 |
| 1JB340 | black | 25 | 155.0 | input structure 2 |
| 1JB341 | green | 30 | 183.95 | input structure 3 |

A.4. Specific Example of Imaginary XML Document

```
<?xml>
<order>
    <product sku="1JB339" color="white">
        <quantity>40</quantity>
        <price>339.50</price>
    </product>
    <product sku="1JB340" color="black">
        <quantity>25</quantity>
        <price>155.0</price>
    </product>
    <product sku="1JB341" color="green">
        <quantity>30</quantity>
        <price>183.95</price>
    </product>
</order>
```

A.5. Example of XML Schema (Cited from Reference Literature 1)

```
<xs:element name="product">
    <xs:complexType>
        <xs:sequence maxOccurs="2">
            <xs:element name="description" type="xs:string" minOccurs="0"/>
            <xs:element name="quantity" type="xs:integer" />
            <xs:element name="price" type="xs:float" />
        </xs:sequence>
        <xs:attribute name="sku" type="xs:string" use="required" />
        <xs:attribute name="color" type="xs:string" use="optional" />
    </xs:complexType>
</xs:element>
<xs:element name="order">
    <xs:complexType>
        <xs:sequence>
            <xs:element ref="product" maxOccurs="unbounded" />
        </xs:sequence>
    </xs:complexType>
</xs:element>
```

A.6. Example of EXI Grammar (Cited from Reference Literature 1)

Complete Grammar for Element <Product>

|  | Event Code |
|---|---|
| Use_color0 : | |
| AT("color") [schema-typed value] Use_color1 | 0 |
| AT("sku") [schema-typed value] Use_sku1 | 1 |
| EE | 2.0 |
| AT(xsi:type) Use_color0 | 2.1 |
| AT(xsi:nil) Use_color0 | 2.2 |
| AT (*) Use_color0 | 2.3 |
| AT("color") [untyped value] Use_color1 | 2.4.0 |
| AT("sku") [untyped value] Use_sku1 | 2.4.1 |
| AT (*) [untyped value] Use_color0 | 2.4.2 |
| SE(*) Use_sku1_copied | 2.5 |
| CH [untyped value] Use_sku1_copied | 2.6 |
| Use_color1 : | |
| AT("sku") [schema-typed value] Use_sku1 | 0 |
| EE | 1.0 |
| AT (*) Use_color1 | 1.1 |
| AT("sku") [untyped value] Use_sku1 | 1.2.0 |
| AT (*) [untyped value] Use_color1 | 1.2.1 |
| SE(*) Use_sku1_copied | 1.3 |
| CH [untyped value] Use_sku1_copied | 1.4 |
| Use_sku1 : | |
| SE("description") Term_description0,1 | 0 |
| SE("quantity") Term_quantity0,1 | 1 |
| EE | 2.0 |
| AT (*) Use_sku1 | 2.1 |
| AT (*) [untyped value] Use_sku1 | 2.2.0 |
| SE(*) Use_sku1_copied | 2.3 |
| CH [untyped value] Use_sku1_copied | 2.4 |
| Use_sku1_copied : | |
| SE("description") Term_description0,1 | 0 |
| SE("quantity") Term_quantity0,1 | 1 |
| EE | 2.0 |
| SE(*) Use_sku1_copied | 2.1 |
| CH [untyped value] Use_sku1_copied | 2.2 |
| Term_description0,1 : | |
| SE("quantity") Term_quantity0,1 | 0 |
| EE | 1 |
| SE(*) Term_description0,1 | 2.0 |
| CH [untyped value] Term_description0,1 | 2.1 |
| Term_quantity0,1 : | |
| SE("price") Term_price0,1 | 0 |
| EE | 1 |
| SE(*) Term_quantity0,1 | 2.0 |
| CH [untyped value] Term_quantity0,1 | 2.1 |
| Term_price0,1 : | |
| SE("description") Term_description1,1 | 0 |
| SE("quantity") Term_quantity1,1 | 1 |
| EE | 2 |
| SE(*) Term_price0,1 | 3.0 |
| CH [untyped value] Term_price0,1 | 3.1 |
| Term_description 1,1 : | |
| SE("quantity") Term_quantity1,1 | 0 |
| EE | 1 |
| SE(*) Term_description1,1 | 2.0 |
| CH [untyped value] Term_description1,1 | 2.1 |
| Term_quantity1,1 : | |
| SE("price") Term_price1,1 | 0 |
| EE | 1 |
| SE(*) Term_quantity1,1 | 2.0 |
| CH [untyped value] Term_quantity1,1 | 2.1 |
| Term_price1,1 : | |
| EE | 0 |
| SE(*) Term_price1,1 | 1.0 |
| CH [untyped value] Term_price1,1 | 1.1 |

Complete Grammar for Element <Order>

|  | Event Code |
|---|---|
| Term_product 0,0 : | |
| SE("product") Term_product 1,0 | 0 |
| EE | 1.0 |
| AT(xsi:type) Term_product 0,0 | 1.1 |
| AT(xsi:nil) Term_product 0,0 | 1.2 |
| AT (*) Term_product 0,0 | 1.3 |
| AT (*) [untyped value] Term_product 0,0 | 1.4.0 |
| SE(*) Term_product 0,0_copied | 1.5 |
| CH [untyped value] Term_product 0,0_copied | 1.6 |
| Term_product 0,0_copied : | |
| SE("product") Term_product 1,0 | 0 |
| EE | 1.0 |
| SE(*) Term_product 0,0_copied | 1.1 |
| CH [untyped value] Term_product 0,0_copied | 1.2 |
| Term_product 1,0 : | |
| SE("product") Term_product 1,0 | 0 |
| EE | 1 |
| SE(*) Term_product 1,0 | 2.0 |
| CH [untyped value] Term_product 1,0 | 2.1 |

The invention claimed is:
1. An EXI (Efficient XML Interchange) encoder device for generating an EXI stream which can be decoded into an XML

(Extensible Markup Language) document, the encoder device generating the EXI stream based on XML schema defining a construction of an XML document, the XML document as defined by the XML schema including a head portion, X body portions, and a tail portion, where X indicates a number of body portions and is an integer equal to or greater than 0, the head portion containing fixed XML content, each of the X body portions containing a variable, and XML content other than the variable in the X body portions being fixed XML content, and the tail portion containing fixed XML content, the encoder device comprising:

an output unit;

a head portion encoder having previously stored therein a first EXI bit string corresponding to the fixed XML content of the head portion, wherein the head portion encoder sends the stored first EXI bit string to the output unit;

a reading unit configured to read-in input data X times, where the X times the input data is read-in is the X number of body portions;

a body portion encoder having previously stored therein an EXI bit string corresponding to the fixed XML content in the X body portions and in which a bit string variable which corresponds to the variable in the X body portions is included, wherein the body portion encoder sends to the output unit a second EXI bit string obtained by replacing the bit string variable included in the EXI bit string with the input data read-in by the reading unit each time the input data is read-in by the reading unit; and a tail portion encoder having previously stored therein a third EXI bit string corresponding to the fixed XML content of the tail portion, wherein the tail portion encoder sends the previously stored third EXI bit string to the output unit, in accordance with an output of the body portion encoder;

wherein the output unit generates an EXI stream including all of the first EXI bit string received from the head portion encoder, X second EXI bit strings received from the body portion encoder, and the third EXI bit string received from the tail portion encoder, and outputs the EXI stream; and wherein the EXI stream is generated without use of an entire initial XML document.

2. The encoder device according to claim 1, further comprising a counter which counts how many times the input data is read-in each time the input data is read-in, wherein the body portion encoder has previously stored therein a plurality of EXI bit strings in each of which the bit string variable is included, and the body portion encoder selects one of the EXI bit strings in accordance with a counted value of the counter, and sends to the output unit the second EXI bit string obtained by replacing the bit string variable included in the selected one of the EXI bit strings with the input data.

3. The encoder device according to claim 1, further comprising a counter which counts how many times the input data is read-in each time the input data is read-in, wherein the tail portion encoder has previously stored therein a plurality of EXI bit strings corresponding to the fixed XML content of the tail portion, and the tail portion encoder selects one of the EXI bit strings in accordance with a total counted value of the counter, and sends to the output unit the selected one of the EXI bit strings as the third EXI bit string.

4. A non-transitory computer readable medium storing a program for EXI (Efficient XML Interchange) encoding to generate an EXI stream which can be decoded into an XML (Extensible Markup Language) document, the encoding generating the EXI stream based on XML schema defining a construction of an XML document, the XML document as defined by the XML schema including a head portion, X body portions, and a tail portion, where X indicates a number of body portions and is an integer equal to or greater than 0, the head portion containing fixed XML content, each of the X body portions containing a variable, and XML content other than the variable in the X body portions being fixed XML content, and the tail portion containing fixed XML content, the program being executable by a computer to cause the computer to perform functions comprising:

outputting a previously stored first EXI bit string corresponding to the fixed XML content of the head portion;

reading-in input data X times from outside, where the X times the input data is read-in is the X number of body portions;

obtaining a second EXI bit string by replacing, in a previously stored EXI bit string corresponding to the fixed XML content in the body portion and in which a bit string variable corresponding to the variable in the X body portions is included, the bit string variable included in the EXI bit string with the input data each time the input data is read-in, and outputting the second EXI bit string;

outputting a previously stored third EXI bit string corresponding to the fixed XML content of the tail portion, in accordance with an output of the second EXI bit string; and receiving the first EXI bit string, X second EXI bit strings, and the third EXI bit string, generating an EXI stream including all of the first EXI bit string, the X second EXI bit strings, and the third EXI bit string, and outputting the EXI stream;

wherein the EXI stream is generated without use of an entire initial XML document.

\* \* \* \* \*